United States Patent [19]

Hauser et al.

[11] 4,027,317
[45] May 31, 1977

[54] CAMERA

[75] Inventors: Raimund Hauser, Vienna; Harald Wessner, Neunkirchen, both of Austria

[73] Assignees: Karl Vockenhuber; Raimund Hauser, both of Vienna, Austria

[22] Filed: Oct. 2, 1973

[21] Appl. No.: 402,745

[30] Foreign Application Priority Data

Oct. 3, 1972 Austria .............................. 8460/72
June 29, 1973 Austria .............................. 5726/73

[52] U.S. Cl. .................................. 354/289; 354/53; 354/199
[51] Int. Cl.² .................. G03B 17/18; G03B 17/20
[58] Field of Search .............................. 354/53–57, 354/234, 235, 219, 70, 72, 198, 199, 200, 201, 60 E, 127, 289, 293, 197

[56] References Cited

UNITED STATES PATENTS

| 2,273,876 | 2/1942 | Lutz et al. ............................ 354/72 |
| 3,006,262 | 10/1961 | MacMillan ..................... 354/198 X |
| 3,455,221 | 7/1969 | Reekie ................................. 354/70 |
| 3,526,177 | 9/1970 | Kiper et al. ..................... 354/60 EI |
| 3,570,382 | 3/1971 | Neudecker et al. ............. 354/53 X |
| 3,605,596 | 9/1971 | Vockenhuber et al. ........ 354/198 X |
| 3,668,985 | 6/1972 | Wazumi ........................... 354/53 X |
| 3,688,657 | 9/1972 | Ueda ............................. 354/60 E X |

FOREIGN PATENTS OR APPLICATIONS 1,447,564 1/1969 Germany .......................... 354/198

*Primary Examiner*—L. T. Hix
*Assistant Examiner*—E. M. O'Connor
*Attorney, Agent, or Firm*—Ernest G. Montague; Karl F. Ross; Herbert Dubno

[57] ABSTRACT

A camera of variable focal length is equipped with an indicator which signals the existence of a condition unsuitable for the taking of pictures because of the risk of blurring. The indicator is controlled by a sensing circuit taking into account such parameters as focal length, exposure time and, possibly, the steadiness of the camera support.

11 Claims, 11 Drawing Figures

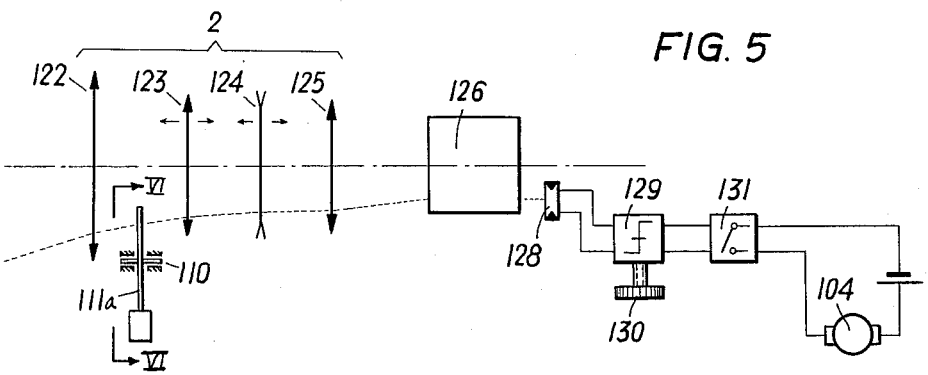
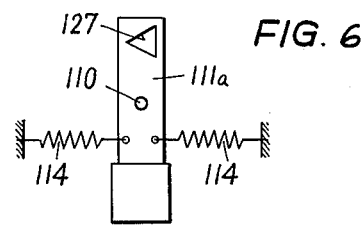
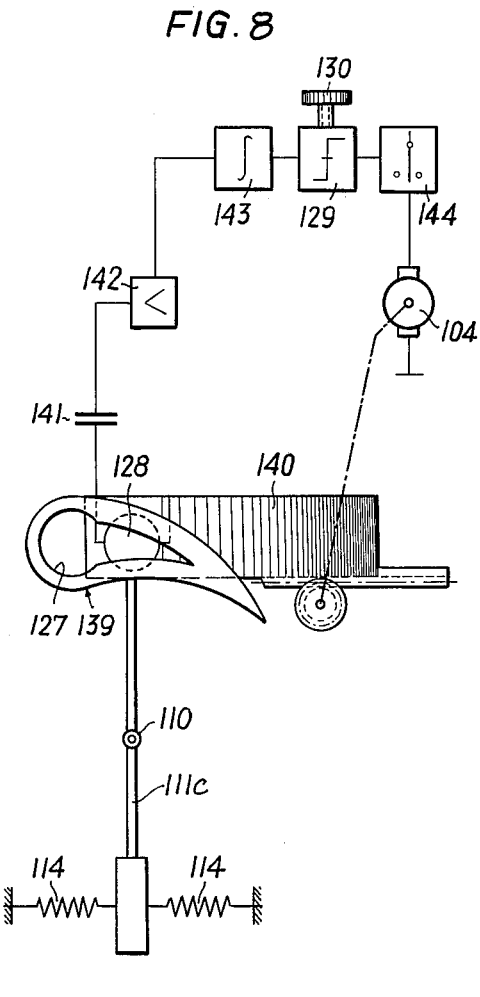
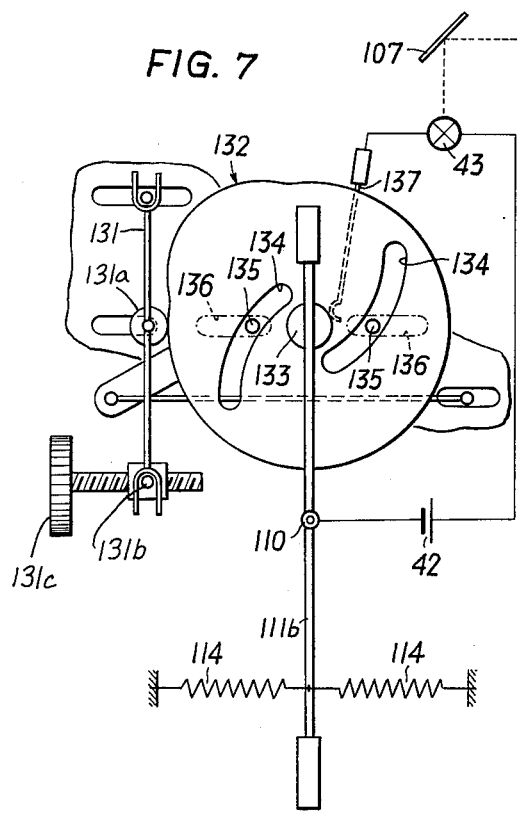

CAMERA

FIELD OF THE INVENTION

Our present invention relates to a camera whose optical system enables changes to be made in its focal length, either through the use of interchangeable lenses or with the aid of a varifocal (zoom-type) objective.

BACKGROUND OF THE INVENTION

In photography or cinematography, the sharpness of a picture depends on a variety of factors such as steadiness of the camera support, exposure time, and depth of field. Steadiness is poor when the camera is held by hand and can be improved through the use of a tripod, for example. The time of exposure of a photosensitive element depends on shutter speed but, under proper lighting conditions, can also be controlled by the flashing of a strobe light. Depth of field is a function of focal length, diaphragm aperture and object distance; under otherwise equal conditions, blurring is greatest with large focal lengths (e.g. with the use of telephoto lenses).

OBJECT OF THE INVENTION

The object of our invention is to provide means in a camera for automatically taking some or all of the aforementioned factors into account in determining whether, in a given situation, a picture can be taken without objectionable blurring.

SUMMARY OF THE INVENTION

We realize this object, in accordance with our invention, by operatively coupling a focal-length sensor with the camera objective for the control of an indicator which signals an exposure time incompatible with a selected focal length. The signal given by the indicator may be the lighting of a warning lamp, for example, or the blocking of an operating element such as a drive motor.

According to another feature of our invention, a control circuit for the indicator may be provided with overriding means for preventing its actuation by the focal-length sensor under certain conditions, especially if blur-reducing measures have been taken. Thus, a switch may be juxtaposed with a seating for an external attachment, such as a tripod mounting or a flash-cube holder, to inhibit the indicator when the corresponding attachment is in place.

BRIEF DESCRIPTION OF THE DRAWING

The above and other features of our invention will now be described in detail with reference to the accompanying drawing in which:

FIG. 5 is a schematic view, partly in block-diagram form, of another embodiment;

FIG. 6 is a detail view taken on the line VI – VI of FIG. 5;

FIG. 7 is a view generally similar to FIG. 6, illustrating a modification of the system of FIG. 5; FIGS. 8 and 9 are views similar to FIG. 7, showing other modifications;

SPECIFIC DESCRIPTION

Figure 1:
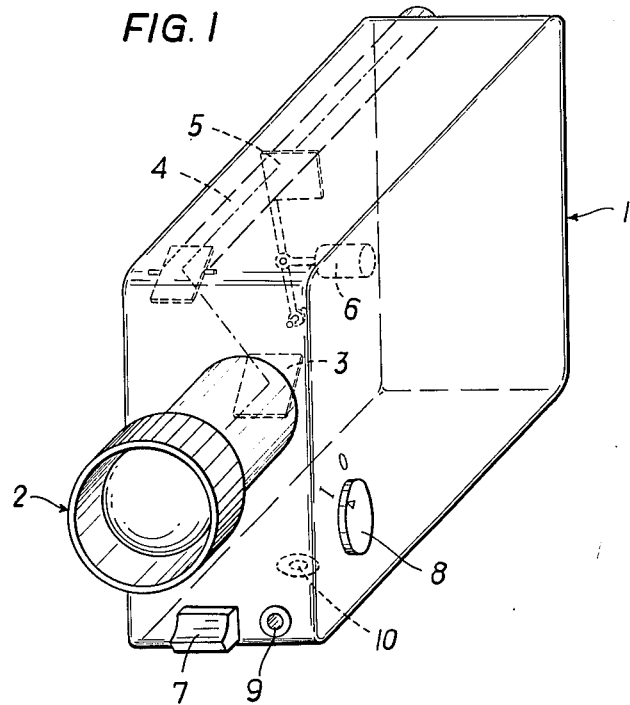
FIG. 1 is a perspective view of a camera emboding our invention.

A camera 1 (FIG. 1), for instance a movie camera, has an objective 2. This objective 2 may either have a variable focal length or be of the interchangeable type, enabling lenses of very large focal length to be attached to the camera 1. As with reflex cameras in common use, a beam-splitter surface 3 reflects a portion of the incident light onto a ray path 4 for a viewfinder. According to the invention, the objective 2 is equipped with means indicating an excessive length which would entail a high risk of blurring with a given exposure time. For signaling this condition, a vane 5 may be brought into the ray path of the viewfinder by a solenoid 6 or the like. If necessary, it is also possible to lock at the same time the shutter so that operation of a shutter release 7 will not cause the exposure of an image. In that case, however, it will be useful to provide inhibiting means for deactivating the locking device, and possibly the indicating device too, in case measures are taken whereby the danger of blurring may be avoided, as putting the camera on a table. Moreover, some blurring may be permissible in the case of exposures of documentary value. We therefore provide a cancellation knob 8 on the camera which disables the locking and/or the indicating device upon being rotated into position 0. Such inhibiting means may also coact with a shutter-release cable, receivable in a nipple 9, since this latter is generally used only when the camera is placed on a stable support. We may also provide inhibiting means at a tripod socket 10 so that the locking and/or indicating device can be deactivated when the tripod is screwed on.

Figure 2:
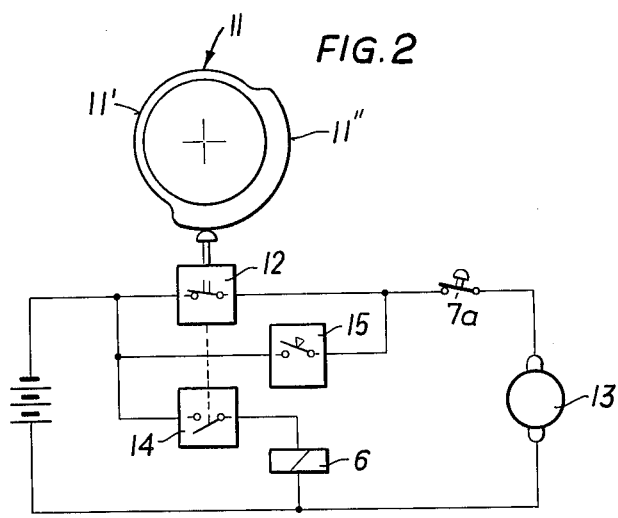
FIG. 2 is a block diagram of a control circuit for a camera as shown in FIG. 1.

FIG. 2 illustrates details of an embodiment wherein the objective 2 is of the varifocal type. A cam 11 is coupled for joint rotation with a nonillustrated ring for adjusting the focal length. The camera 1 has a motor 13 by which the shutter is driven. In the circuit of this motor there is inserted a trigger switch 7a whose closure normally energizes the motor 13. Cam 11 operates a schematically illustrated control switch 12 which lies in series with the trigger switch 7a and operates as a circuit breaker. Upon selection of a shorter focal length of the objective 2, a large-radius dwell 11" of the cam 11 holds the switch 12 closed. On the other hand, with a larger focal length of the objective 2, a small-radius dwell 11' of the cam 11 engages the circuit breaker 12 and allows it to open.

Trigger switch 7a and control switch 12 may be considered the equivalent of a logical AND-gate, since the motor 13 runs and operates the shutter of camera 1 only if both switches are closed. Switch 12 therefore effectively locks the shutter when, upon adjusting the objective 2, a focal length exceeding a predetermined magnitude is selected. However, with varifocal objectives it may happen that during zooming the exposure will be interrupted. Therefore such a locking device is more advantageous for a camera with interchangeable lenses. On the other hand, with varifocal objectives it is more advantageous if the motor 13 is a zooming motor operable by means of switch 7a to increase the focal length. Then, as soon as the objective reaches the telephoto position, the low dwell 11' of cam 11 opens the switch 12 so that at first the motor 13 is de-energized. At the same time another switch 14 is closed to energize the solenoid 6 which indicates to the user that he must taken certain precautions agaist blurring. Control switch 12 is shunted by an overriding switch 15. The combination of switches 12 and 15 may be regarded as the equivalent of a logical OR-gate because closure of either of them enables the switch 7a to energize the motor 13. The overriding switch 15 may be operable by hand or in the manner illustrated in the following Figures. Naturally, switches 12, 14, 15 or their logical counterparts may be realized in different manner.

Figure 3:
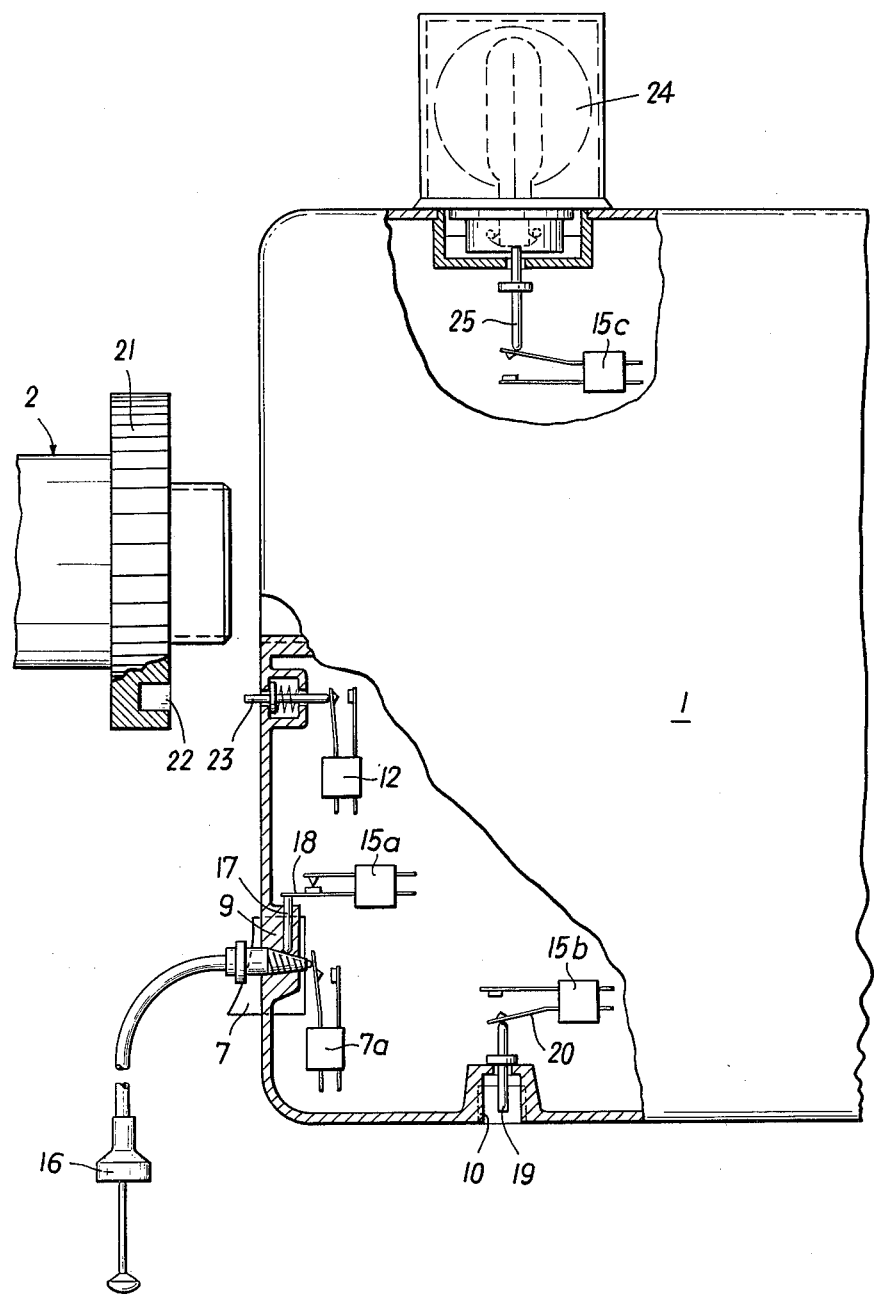
FIG. 3 is a somewhat schematic side view of a camera (partly broken away) incorporating a control circuit similar to that shown in FIG. 2.

In FIG. 3 the electrical connections of various switches 12, 15a, 15b, 15c, similar to those of FIG. 1, have been omitted for the sake of clarity. Trigger switch 7a is here shown operable not only by a button 7 but also by a cable 16 which is screwed into the nipple 9. In the nipple 9 there is provided a pin 17 which in the absence of cable 16 is depressed by a contact spring 18 of shunt switch 15a. When, however, the cable 16 is screwed in, the pin 18 is displaced so that the switch 15a is closed. A further pin 19 provided in the socket 10 is depressed by a contact spring 20 of shunt switch 15b into the illustrated position in the absence of a tripod.

In the embodiment according to FIG. 3 the objective 2 is interchangeably attached to the camera 1. The objective 2, assumed to be of large focal length, has a flange 21 with an annular recess 22. When a lens assembly of objective 2 is replaced by one of short focal length whose flange 21 lacks the recess 22, the circuit breaker 12 is closed by means of a pin 23, whereas in the illustrated case the pin 23 projects into the recess 22 and the switch 12 stays open. The camera may be used only if one of the overriding switches 15a or 15b is closed or a flash cube 24 for extremely short exposure time is attached. This flash cube 24 co-operates with a pin 25, similar to the pins 17 and 19, which controls the third overriding switch 15c.

Figure 4:
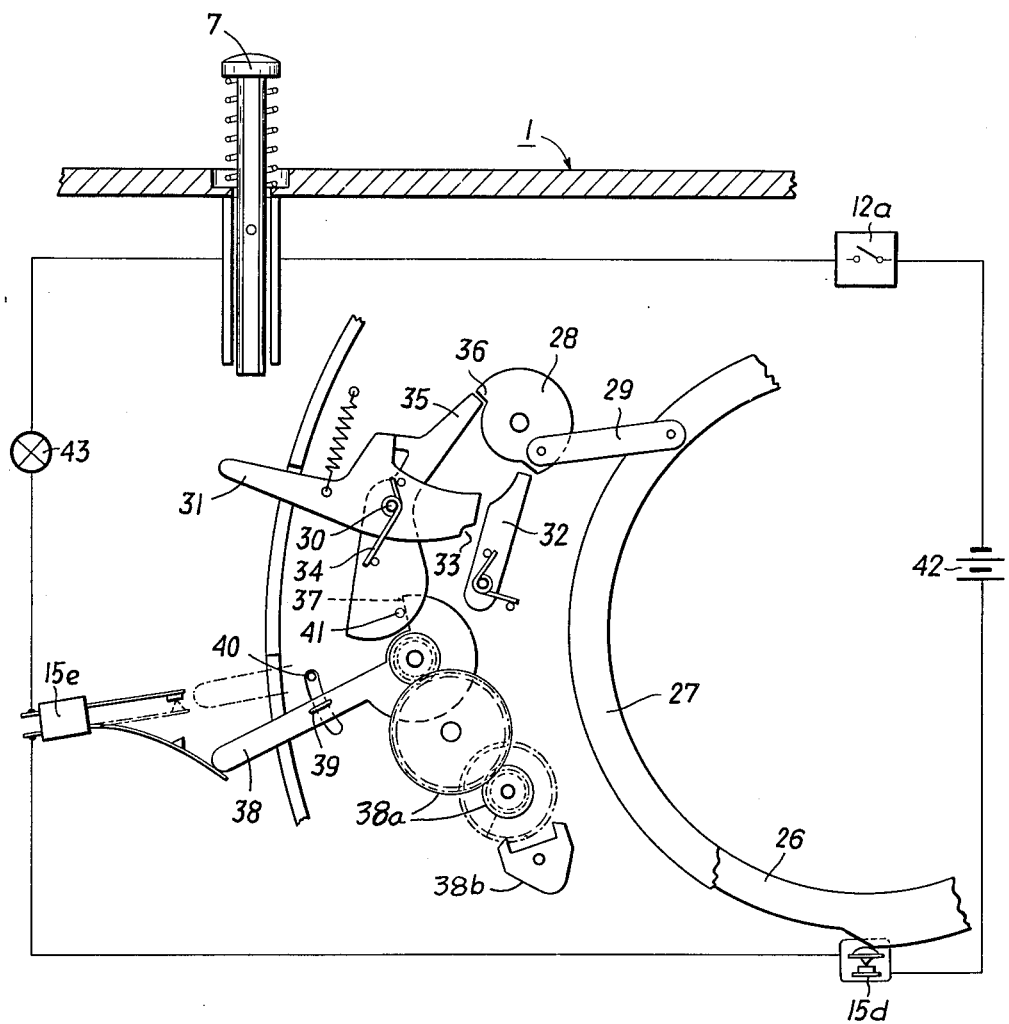
FIG. 4 shows details of a shutter-control mechanism for a camera according to our invention.

FIG. 4 illustrates a further embodiment wherein a photographic camera 1 is provided at its top with a shutter-release button 7. A conventional shutter mechanism comprises a setting ring 26 for selecting the shutter speed and an actuating ring 27 for the nonillustrated shutter sectors driven by a disk 28 whose movement is transmitted to the ring 27 via a link 29. The tensioning mechanism for the driving disk 28 is likewise well known and therefore not shown.

In order to trip the shutter, button 7 co-operates with a release lever 31 having a pivot 30. If this release lever is turned in counterclockwise direction by depressing the button 7, the release lever 31 is arrested in this position by a locking pawl 32 which snaps in behind a shoulder 33. With the release lever 31 a further lever 35, which normally blocks the driving disk 28, is resiliently connected by a hairpin spring 34. As soon as the lever 35 has cleared a projection 36 of the disk 28, the shutter is released.

The shutter described above is provided with a self-timer of well-known construction which includes a presetting lever 38, a gear train 38a and a double pawl 38b. The release of lever 35 is controlled not only by the detent 31 but also by a face 37 of lever 38. The latter has a lug 39 which engages a stop 40 in a rest position of lever 38 in which the face 37 is removed from the path of a pin 41 on lever 35 so that this lever may follow the movements of the release lever 31. On the other hand, the disengagement of detent 35 from disk 28 is delayed to a greater or less extent in all other positions of presetting lever 38.

The system of FIG. 4 is provided, according to our invention, with an indicator circuit including a source of current 42 in series with a control switch 12a generally similar to the switch 12 of FIG. 3, except that switch 12a is closed when the focal length of the objective exceeds a certain value. Such closure energizes a signal lamp 43 which is visible in the viewfinder.

Here, again, inhibiting switches 15d, 15e are provided which deactivate the warning lamp 43 when measures are taken which avoid blurring of the pictures. Such measures may consist in setting very short exposure times by means of the adjusting ring 26. Therefore the adjusting ring 26 has a cam, similar to cam 11 of FIG. 2, by which upon a setting a high shutter speeds the switch 15d will be opened As the switches 12a and 15d are in series, the lamp 43 lights only if both switches are closed. Switch 15e is controlled by the adjusting lever 38 of the self-timer which generally is used only when the camera is placed on a stable support such as a table. As may be seen, the switch 15e is closed in the rest position of the lever 38, indicated in dotted lines, whereas it is opened when the self-timer is preset as shown in full lines.

In FIGS. 5 and 6 we have diagrammatically illustrated the individual components of the objective 2 as thin lenses 122 to 125 and as a block 126. The lenses 123, 124 are displaceable by a motor 104 in order to alter the focal length. Behind the front lens 122, in the range of the otherwise unused marginal rays, there is provided the pivotal axis 110 of a vibration-sensing lever 111a which according to FIG. 6 has a triangular aperature 127. Part of this aperture 127 is projected behind the objective 2 onto a photoelectric transducer 128, the size of the projected image varying with the focal length. When in consequence of an intense movement the lever 11a begins to swing about the axis 110, the aperture 127 is fully imaged for a short time on the photoelectric transducer 128 which during this time delivers a correspondingly higher output signal. Thus, the output signal of the photoelectric transducer depends on the one hand on the focal length and on the other hand on the swing of the lever 111a. The more widely the lever 111a swings the larger will be the briefly illuminated area of the transducer 128; with increased focal length this illuminated area also widens. The transducer 128 works into a threshold circuit 129 whose threshold value is adjustable by a knob 130 on the outside of the camera. The threshold circuit 129 controls a switch 131 which lies in series with the circuit of the zoom motor 104 whereby this circuit is opened when the transducer output signal exceeds the threshold of circuit 129.

In FIG. 7 we have shown an arrangement for adjusting the focal length of an objective as described in German printed Specification No. 1,127,703. A control shaft 133, carrying an adjusting cam 132, is rotatable to vary the focal length via a cam follower 131a on a lever 131 whose fulcrum 131b is adjustable by a screw 131c. Two spiral slots 134 are formed in cam 132 and are engaged by contact pins 135 which are guided in radial slots 136 in a plate (not shown) lying in front of the cam 132. Depending on the setting of the cam 132, the pins 135 occupy different positions along the slots 136.

A sliding contact 137, bearing upon the shaft 133, is connected via the signal lamp 43 and current source 42 to the pivot 110 of a vibration-sensing lever 111b of conductive material. When this lever 111b touches one of the contact pins 135, the circuit is closed and the signal lamp 43 lights up. Since the setting of cam 132 according to the selected focal length determines the distance of the pins 135 from shaft 133, the permissible swing amplitude of the lever 111b depends on that focal length. If the lever 111b swings beyond that permissible range, it contacts with each swing one of the pins 135 whereby the control lamp 43 is lit.

FIG. 8 shows an embodiment without galvanic contacts in which a vibration-sensing lever 111c carries a diaphragm 139 with a drop-shaped, generally triangular aperture 127 through which light coming from the objective 2 or from a separate source may impinge onto the photoelectric transducer 128 as illustrated in FIG. 5. A gray wedge 140 displaceable by the motor 104 lies with its lighter part in front of the photoelectric transducer 128 if the objective is adjusted for a longer focal length, whereas with shorter focal lengths the darker part of the gray wedge 140 lies in front of that transducer. Swinging of lever 111c about its axis 110 generates an a-c signal in the output of the photoelectric transducer 128, the amplitude of this alternating current depending on the one hand on the magnitude of the swing and on the other hand on the position of the wedge 140 and therefore on the focal length of the objective 2 (FIG. 5) whose movable lenses 123, 124 are driven by the same motor 104. The direct-current portion of the signal is filtered out through a coupling condenser 141, whereas the a-c signal is conducted via an amplifier 142 and an integrator 143 to the threshold circuit 129; the latter controls a change-over switch 144 having two working positions, besides a neutral position, according to the two possible directions of rotation of the motor 104.

Normally, the position of the change-over switch 144 depends only on the position of a nonillustrated manually operable key. Should, however, the circuit 129 receive a voltage exceeding its threshold, the switch 144 is automatically moved from its neutral position into one of its working positions, namely that position in which the reversible motor 104 displaces the movable lenses 123, 124 in a sense shortening the focal length of the objective 2. This movement, in turn, shifts the gray wedge 140 to the left and consequently reduces the illumination of transducer 128 until the output voltage of integrator 143 drops below the threshold of circuit 144.

Figure 9:
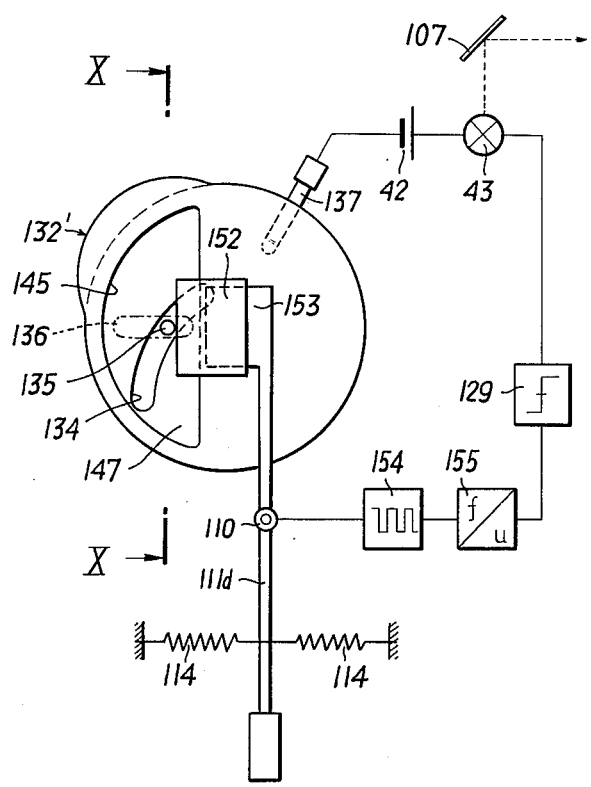
Figure 10:
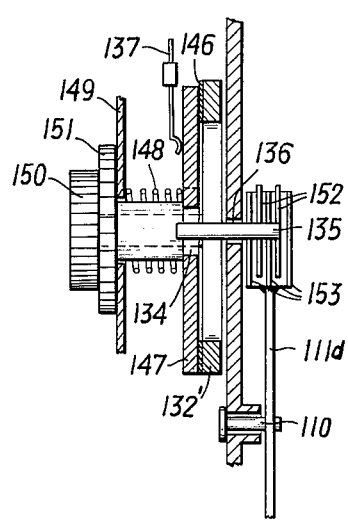
FIG. 10 is a cross-sectional view taken on the line X — X of FIG. 9.

Another contactless modification of the system of FIG. 7 is shown in FIGS. 9 and 10. In this instance a cam 132' has a segmental aperture 145 and is provided on one side with a friction layer 146 which abuts a disk 147 under the pressure of a coil spring 148. The spring 148 bears at its other end on a wall 149 of the camera which is externally provided with a rotary knob 150 to adjust the focal length and a further rotary knob 151 for turning the disk 147 which has a single spiral slot 134 engaged by a pin 135. Pin 135 carries a number of condenser plates 152 interleaved with other condenser plates 153 on a vibration-sensing lever 111d.

Since the slotted disk 147 is frictionally entrained by the adjusting cam 132', it rotates accordingly when the adjusting knob 150 for the focal length is actuated. It is possible, however, to adjust the rotary knob 151 so as to alter the response threshold inasmuch as the capacitance of the condenser formed by the plates 152, 153 depends on the extent of their overlap which in turn depends on the one hand on the adjustment of the cam 132' and on the other hand on the excursion of the lever 111' if the camera should be moved. A change in the capacitance of the condenser 152, 153 alters the frequency of an oscillator 154 working into a frequency/voltage converter 155. The output of this converter 155 feeds the threshold circuit 129 energizing the signal lamp 43 if the overlap the condenser plates 152, 153 increases to a certain value. In this case the adjusting knob 130 for the threshold of circuit 129 illustrated in FIGS. 5 and 8 is omitted as the response threshold can be adjusted by relative rotation of the two knobs 150, 151.

Figure 11:
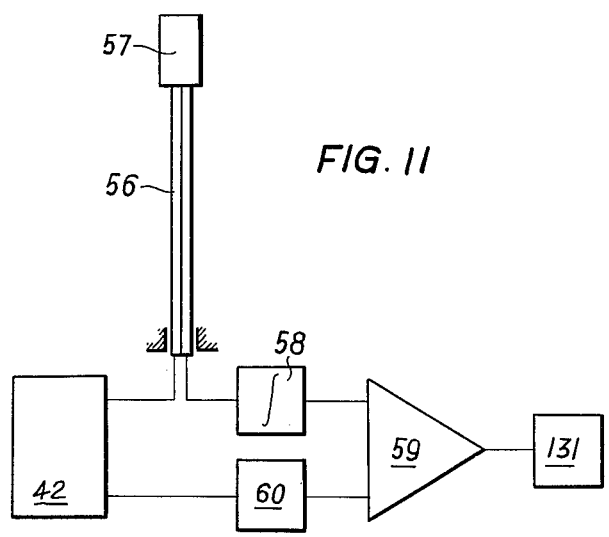
FIG. 11 is a diagrammatic detail view of still another embodiment.

According to another feature of our invention, a piezoelectric strip 56 may be used for vibration measurements as shown in FIG. 11. Strip 56 is fixedly anchored at one end and carries a mass 57 on the other hand. The advantage of such piezoelectric strips lies in the fact that their output signal is independent of the position of the camera relative to the horizontal and depends only on acceleration. The output signal of the piezoelectric strip 56 is transmitted through an integrator 58 to a comparison circuit 59 which also receives a signal from a focal-length sensor 60 at its other input. The output of the comparison circuit 59 may be connected for instance to the control switch 131 of FIG. 5.

What is claimed is:

1. In a camera including objective means of changeable focal length, trigger means for briefly exposing a photosensitive element to light from said objective means, and a housing provided with seating means for an optional external attachment whose use reduces the risk of blurring during picture taking with a given exposure-time and focal-length setting, in combination:

sensing means operatively coupled with said objective means for distinguishing among different focal lengths thereof;

indicator means controlled by said sensing means for signaling a focal-length setting conductive to excessive blurring in the absence of said external attachment;

feeler means juxtaposed with said seating means for displacement by said external attachment; and overriding means controlled by said feeler means for preventing actuation of said indicator means in the presence of said external attachment.

2. The combination defined in claim 1 wherein said seating means comprises a nipple adapted to receive an extremity of a cable for acuating said trigger means.

3. The combination defined in claim 1 wherein said seating means comprises a mounting for a tripod.

4. The combination defined in claim 1 wherein said seating means comprises a holder for a flash cube.

5. The combination defined in claim 1 wherein said indicator means is provided with a control switch actuable by said sensing means.

6. The combination defined in claim 5 wherein said indicator means comprises visual signaling means operable by said control switch.

7. The combination defined in claim 5 wherein said indicator means comprises an operating circuit for said trigger means interruptable by said control switch.

8. The combination defined in claim 7 wherein said trigger means comprises a drive motor, said control switch being a circuit breaker in series with said drive motor.

9. The combination defined in claim 5 wherein said overriding comprises another switch in shunt with said control switch for selectively rendering same ineffectual.

10. The combination defined in claim 1 wherein said objective means comprises first and second lens means of different focal lengths with respective mountings interchangeably receivable on said housing, said sensing means comprising a spring-loaded element on said housing repressible by the mounting of said first lens means, the mounting of said second lens means being recessed at a location confronting said element for avoiding displacement thereof upon installation of said second lens means of the camera.

11. The combination defined in claim 1 wherein said objective means comprises a varifocal objective provided with movable adjusting means, said sensing means including a contactor engaging said adjusting means.

* * * * *